United States Patent
Moore et al.

(10) Patent No.: US 10,121,193 B2
(45) Date of Patent: Nov. 6, 2018

(54) FACULTATIVE UNDERWRITING SYSTEM AND METHOD

(75) Inventors: William E. Moore, Old Greenwich, CT (US); Thomas D. McCarthy, Norwalk, CT (US)

(73) Assignee: Swiss Reinsurance Company Ltd., Zurich (CH)

( * ) Notice: Subject to any disclaimer, the term of this patent is extended or adjusted under 35 U.S.C. 154(b) by 3791 days.

(21) Appl. No.: 10/120,296

(22) Filed: Apr. 10, 2002

(65) Prior Publication Data
US 2003/0195776 A1 Oct. 16, 2003

(51) Int. Cl.
G06Q 40/08 (2012.01)
G06Q 40/02 (2012.01)
G06Q 10/10 (2012.01)
G06F 17/30 (2006.01)

(52) U.S. Cl.
CPC ............. *G06Q 40/02* (2013.01); *G06Q 40/08* (2013.01)

(58) Field of Classification Search
CPC ........ G06Q 40/08; G06Q 40/02; G06Q 40/06; G06Q 10/0635
USPC .......................................................... 705/4
See application file for complete search history.

(56) References Cited

U.S. PATENT DOCUMENTS

| | | | | |
|---|---|---|---|---|
| 4,975,840 A * | 12/1990 | DeTore | ................. | G06F 19/328 705/4 |
| 6,937,990 B1 * | 8/2005 | Walker et al. | .................... | 705/4 |
| 7,080,020 B1 * | 7/2006 | Klaus | ................................ | 705/4 |
| 7,240,016 B1 * | 7/2007 | Sturgis | .............. | G06Q 30/0203 434/322 |
| 2002/0082874 A1 * | 6/2002 | Go | ......................... | G06Q 40/08 705/4 |
| 2002/0082875 A1 * | 6/2002 | Best-Devereux | ...... | G06Q 40/00 705/4 |
| 2002/0138307 A1 * | 9/2002 | Kramer | ................. | G06Q 10/10 705/4 |
| 2002/0143583 A1 * | 10/2002 | Reader et al. | .................... | 705/4 |
| 2002/0143584 A1 * | 10/2002 | Lundegren | ....................... | 705/4 |
| 2003/0004864 A1 * | 1/2003 | Kregor | ................... | G06Q 40/02 705/38 |
| 2003/0018497 A1 * | 1/2003 | Luedtke | ................. | G06Q 40/02 705/4 |
| 2003/0144887 A1 * | 7/2003 | Debber | .................. | G06Q 40/08 705/4 |

(Continued)

OTHER PUBLICATIONS

"SCOR Re Launches Online Facultative Submission System", 1 page, Mar. 27, 2000 (Year: 2000).*

(Continued)

*Primary Examiner* — Rachel L. Porter
(74) *Attorney, Agent, or Firm* — Oblon, McClelland, Maier & Neustadt, L.L.P.

(57) ABSTRACT

A method for processing a life insurance facultative case summary submission over a network between a ceding company and a reinsurer. Initially, a facultative case summary submission is received by the reinsurer from the ceding company via the network. Thereafter, a facultative decision is rendered by the reinsurer based on the received facultative case summary submission. Because the information is summarized and sent electronically or via voice message, less information is processed in a faster period of time thereby rendering quicker decisions than when the complete case history is submitted to the reinsurer for review.

17 Claims, 29 Drawing Sheets

(56) References Cited

U.S. PATENT DOCUMENTS

2003/0154085 A1* 8/2003 Kelley .................. G06F 17/243
  704/275
2004/0236698 A1* 11/2004 Sweeney ........................ 705/64

OTHER PUBLICATIONS

"Understanding Facultative Reinsurance," Mar. 2017 (Year: 2017).*
http:\\agorareinfo.com (printed Aug. 21, 2001).
http:\\facworld.com (printed Aug. 29, 2001).
http:\\scor.com (printed Aug. 29, 2001).

* cited by examiner

Swiss Re Life & Hea

John Does
JCM Insurance
45 Main Street
Avon, CT 06001

T: 123-123-4567 Ext.
F: 203-456-7890
thomas_mccarthy@swiss

Welcome John Does to FacEasy.com

Using FacEasy.com you can easily submit either a summary of a new individual case or a joint case or even additional papers.

Submit an *individual case*
— 305

Submit *additional papers* or *supplemental information* on a previously submitted tradional case or a summarized case.
— 310

Although joint cases must be submitted separately through FacEasy.com, we can help simplify the process for you. You can of course choose to either summarize or submit traditionally, any impaired second life.

Submit a *joint case*
— 315

FAQ's | Contact Us

© by Swiss Re. All rights reserved. Please send comments or suggestions to FacEasy.com Administrator.

Figure 3

| FacEasy | | Swiss Re Life |
|---|---|---|
| | Initial Summarized Data Capture | |
| | Welcome John Does | John Does<br>JCM Insurance<br>45 Main Street<br>Avon, CT 06001<br><br>T: 123-123-4567 Ext.<br>F: 203-456-7890<br>thomas_mccarthy@swiss |

First Name: [ ]
Middle Initial: [ ]  } 410
Last Name: [ ]

*Policy Number: [ ] ~415
*JCM Insurance Policy Number

*Amount($): [ ] ~420
*Total amount applied for

Date of Birth: [Jan ▼] [01 ▼] [ ] ~425
             Month  Day  Year

Place of Birth: [Please Select ------> ▼] ~430
Residence: [Please Select ------> ▼] ~435
Sex: ◯ Male    ◯ Female ← 440
Tobacco: [Please Select ------> ▼] ~445
Family History: [Please Select ------> ▼] ~450
Cholesterol/HDL: [Ratio ------> ▼] ~455
Build/Blood Pressure: [Please Select ------> ▼] ~460

Signed, dated MIB authorization and pre-notice present? 465
    ◯ Yes    ◯ No

Please check all the reinsurance companies you wish to submit your case summary to. You must select at least one.
    470
☐ JCM Re Company    ☐ Swiss Re Life & Health

[Go>] ~475

FAQ's | Contact Us
© by Swiss Re. All rights reserved. Please send comments
or suggestions to FacEasy.com Administrator.

Figure 4

FacEasy

Swiss Re Life

Preliminary Data Capture

Click the <-- Go Button below if you wish to change any of the information below: 505

[<--Go]

| | |
|---:|:---|
| Patient Name: | Suzanne P Webber |
| Policy Number: | 12345678 |
| Amount: | $1,000,000.00 |
| D.O.B.: | 01/06/1951 |
| Place of Birth: | DE |
| Residence: | DE |
| Sex: | Female |
| Tobacco: | Cigarettes |
| Family History: | Two of more than 2 parents and/or siblings under 60 |
| Cholesterol/HDL: | <3.0 |
| Build/BP Normal: | Build and blood pressure acceptable |
| MIB Authorization: | Yes |

John Does
JCM Insurance
45 Main Street
Avon, CT 06001

T: 123-123-4567 Ext.
F: 203-456-7890
thomas_mccarthy@swiss

[Go▸] Choose this button if you are satisfied with the information entered above, and wish to continue to the selection.
510

FAQ's | Contact Us
©2001 by Swiss Re All rights reserved Please send comments or suggestions to FacEasy.com Administrator

Figure 5

FacEasy

Swiss Re Life

Channel Selection

Submission #444

| | |
|---|---|
| Patient Name: | Suzanne P Webber |
| Policy Number: | 12345678 |
| Amount: | $1,000,000.00 |
| D.O.B.: | 01/06/1951 |
| Place of Birth: | DE |
| Residence: | DE |
| Sex: | Female |
| Tobacco: | Cigarettes |
| Family History: | Two of more than 2 parents and/or siblings under 60 |
| Cholesterol/HDL: | <3.0 |
| Build/BP Normal: | Build and blood pressure acceptable |
| MIB Authorization: | Yes |

John Does
JCM Insurance
45 Main Street
Avon, CT 06001

T: 123-123-4567 Ext.
F: 203-456-7890
thomas_mccarthy@swiss

Transmission Channels

[i] Please select the transmission channel you wish to use:
How do I choose a channel?

[Go▶] *Electronic Summary* - includes imaged file upload, and drop down impairment.
605

[Go▶] *Fax Summary* - contact information is made available to fax impairment summaries.
610

[Go▶] *Voice Summary* - contact information is made available to transmit impairment summaries by phone.
615

FAQ's | Contact Us
©2001 by Swiss Re All rights reserved Please send comments
or suggestions to FacEasy.com Administrator

Figure 6

Electronic Summary

If you wish to copy a summary from an electronic document, cut the information from the original document, and paste it into the space below. If you wish to skip this step, and use our drop down impairment section, and/or our upload file section, click the skip this step button.

715 — Skip This Step >>>

Swiss Re Life

John Does
JCM Insurance
45 Main Street
Avon, CT 06001

T: 123-123-4567 Ext.
F: 203-456-7890
thomas_mccarthy@swiss

Submission #444

| | |
|---:|:---|
| Patient Name: | Suzanne P Webber |
| D.O.B.: | 01/06/1951 |
| Amount: | 12345678 |
| Policy Number: | $1,000,000.00 |
| Place of Birth: | DE |
| Residence: | DE |
| Sex: | Female |
| Tobacco: | Cigarettes |
| Family History: | Two of more than 2 parents and/or siblings under 60 |
| Cholesterol/HDL: | <3.0 |
| Build/BP Normal: | Build and blood pressure acceptable |
| MIB Authorization: | Yes |
| Comments: | |

Summarize file below. Need Help?   705

[ Continue --> ]
710

FAQ's | Contact Us
©2001 by Swiss Re All rights reserved Please send comments
or suggestions to FacEasy.com Administrator

Figure 7

Drop Down Impairments

If you wish to skip this section, click Skip This Step. Otherwise, choose an impairment from the drop down list below.

815 [ Skip This Step >>> ]

John Does
JCM Insurance
45 Main Street
Avon, CT 06001

T: 123-123-4567 Ext.
F: 203-456-7890
thomas_mccarthy@swiss

Submission #444

| Patient Name: | Suzanne P Webber |
|---|---|
| D.O.B.: | 01/06/1951 |
| Amount: | 12345678 |
| Policy Number: | $1,000,000.00 |
| Place of Birth: | DE |
| Residence: | DE |
| Sex: | Female |
| Tobacco: | Cigarettes |
| Family History: | Two of more than 2 parents and/or siblings under 60 |
| Cholesterol/HDL: | <3.0 |
| Build/BP Normal: | Build and blood pressure acceptable |
| MIB Authorization: | Yes |
| Comments: | |

Choose an impairment from below:

[ Go ▸ ] [ Alcohol and/or Drug Treatment ▼ ] 805
810

FAQ's | Contact Us
©2001 by Swiss Re All rights reserved Please send comments
or suggestions to FacEasy.com Administrator

Figure 8

Drop Down Impairments - Alcohol and/or Drug Treatment

Submission #444

| | |
|---:|:---|
| Patient Name: | Suzanne P Webber |
| D.O.B.: | 01/06/1951 |
| Amount: | 12345678 |
| Policy Number: | $1,000,000.00 |
| Place of Birth: | DE |
| Residence: | DE |
| Sex: | Female |
| Tobacco: | Cigarettes |
| Family History: | Two of more than 2 parents and/or siblings under 60 |
| Cholesterol/HDL: | <3.0 |
| Build/BP Normal: | Build and blood pressure acceptable |
| MIB Authorization: | Yes |
| Comments: | |

John Does
JCM Insurance
45 Main Street
Avon, CT 06001

T: 123-123-4567 Ext.
F: 203-456-7890
thomas_mccarthy@swiss

Alcohol and/or Drug Treatment

| | |
|:---:|:---|
| What type of substance abuse was treated? | ☐ Alcohol<br>☐ Drugs |
| Type of treatment? | ☐ In-patient treatment center<br>☐ Outpatient<br>☐ Psychotherapy / counseling<br>☐ Antabuse treatment |
| Time since treatment completed? | Choose One ▼ |
| Number of Years abstinent from alcohol or Drug-Free? | Choose One ▼ |
| Current Alcohol Use? | Choose One ▼ |
| History of relapses? | Choose One ▼ |
| Time since last relapse? | Choose One ▼ |

| | |
|---|---|
| 🛈 Drugs used? | ☐ Amphetamines<br>☐ Barbiturates<br>☐ Cannabis<br>☐ Cocaine<br>☐ Hallucinogens<br>☐ Opiates |
| 🛈 Additional modifiers and factors: | ☐ Active in AA or similar organization<br>☐ Stable employment history<br>☐ Normal liver enzymes currently<br>☐ Normal CDT<br>☐ Normal MCV<br>☐ Normal HDL Cholesterol |
| 🛈 Additional comments? | [text box] 910 |

Submit 905

FAQ's | Contact Us
©2001 by Swiss Re All rights reserved Please send comments
or suggestions to FacEasy.com Administrator

Figure 9B

Drop Down Impairments

The results from the drop down impairment forms that you have filled out are listed below. You may continue to add more impairments by choosing another impairment from the drop down list below. Or click Next Step to move on.

Swiss Re Life

John Does
JCM Insurance
45 Main Street
Avon, CT 06001

T: 123-123-4567 Ext.
F: 203-456-7890
thomas_mccarthy@swiss

1010 [ Next Step >>> ]

Submission #444

| | |
|---|---|
| Patient Name: | Suzanne P Webber |
| D.O.B.: | 01/06/1951 |
| Amount: | 12345678 |
| Policy Number: | $1,000,000.00 |
| Place of Birth: | DE |
| Residence: | DE |
| Sex: | Female |
| Tobacco: | Cigarettes |
| Family History: | Two of more than 2 parents and/or siblings under 60 |
| Cholesterol/HDL: | <3.0 |
| Build/BP Normal: | Build and blood pressure acceptable |
| MIB Authorization: | Yes |
| Comments: | |
| Chosen Impairments: | Alcohol and/or Drug Treatment |

Alcohol and/or Drug Treatment: History of relapses?: None
Alcohol and/or Drug Treatment: Drugs used?: Cannabis
Alcohol and/or Drug Treatment: What type of a substance abuse was treated?: Alcohol
Alcohol and/or Drug Treatment: Type of Treatment?: Outpatient
Alcohol and/or Drug Treatment: Additional modifiers and factors:: Active in AA or similar organization
Alcohol and/or Drug Treatment: Time since treatment completed?: Over 4 years ago
Alcohol and/or Drug Treatment: Time since last relapse?: Over 4 years ago
Alcohol and/or Drug Treatment: Number of Years abstinent from alcohol or Drug-Free?: Over 4 years ago
Alcohol and/or Drug Treatment: Current Alcohol Use?: None
Alcohol and/or Drug Treatment: Additional comments?:

Choose an impairment from below:

[ Go ▸ ] [ Alcohol and/or Drug Treatment ▼ ] 1005

Figure 10

FacEasy

Imaged File Summary

Swiss Re Life

To upload an imaged file or a document, choose the browser button below to choose the file from your hard drive, then click Go! If you do not need to upload a file, click click Finalize Submission.

John Does
JCM Insurance
45 Main Street
Avon, CT 06001

1110 [ Finalize Your Submission ]

T: 123-123-4567 Ext.
F: 203-456-7890
thomas_mccarthy@swiss

Submission #444

| | |
|---:|---|
| Patient Name: | Suzanne P Webber |
| D.O.B.: | 01/06/1951 |
| Amount: | 12345678 |
| Policy Number: | $1,000,000.00 |
| Place of Birth: | DE |
| Residence: | DE |
| Sex: | Female |
| Tobacco: | Cigarettes |
| Family History: | Two of more than 2 parents and/or siblings under 60 |
| Cholesterol/HDL: | <3.0 |
| Build/BP Normal: | Build and blood pressure acceptable |
| MIB Authorization: | Yes |
| Comments: | |

[i] Attach Imaged File Below: Need Help?

[            ] [ Browse ]
[ Go! ]          1105
1115

FAQ's | Contact Us
©2001 by Swiss Re All rights reserved Please send comments
or suggestions to FacEasy.com Administrator

Figure 11

Submission #446

Fax Channel - if you wish to add additional comments, please do so in the comment box below. Otherwise, leave blank, and click continue.

| | |
|---:|:---|
| Patient Name: | Suzanne P Webber |
| D.O.B.: | 08/10/1970 |
| Amount: | 987654321 |
| Policy Number: | $5,000,000.00 |
| Place of Birth: | AL |
| Residence: | AB |
| Sex: | Female |
| Tobacco: | No Tobacco Use |
| Family History: | One parent or sibling under 60 |
| Cholesterol/HDL: | <3.0 |
| Build/BP Normal: | Build and blood pressure acceptable |
| MIB Authorization: | Yes |

John Does
JCM Insurance
45 Main Street
Avon, CT 06001

T: 123-123-4567 Ext.
F: 203-456-7890
thomas_mccarthy@swiss

Comments:

[ text box ] 1305

[ Continue --> ] 1310

FAQ's | Contact Us
*2001 by Swiss Re All rights reserved Please send comments
or suggestions to FacEasy.com Administrator

Figure 13

Submission #446

Fax Channel - Listed below are the comments you entered on the previous page If you wish to change your comments, click the <-- Go button below. Otherwise, click continue.

Swiss Re Life

John Does
JCM Insurance
45 Main Street
Avon, CT 06001

T: 123-123-4567 Ext.
F: 203-456-7890
thomas_mccarthy@swiss

[<--Go]

| | |
|---|---|
| Patient Name: | Suzanne P Webber |
| D.O.B.: | 08/10/1970 |
| Amount: | 987654321 |
| Policy Number: | $5,000,000.00 |
| Place of Birth: | AL |
| Residence: | AB |
| Sex: | Female |
| Tobacco: | No Tobacco Use |
| Family History: | One parent or sibling under 60 |
| Cholesterol/HDL: | <3.0 |
| Build/BP Normal: | Build and blood pressure acceptable |
| MIB Authorization: | Yes |
| Comments: | |

[Continue -->] 1405

FAQ's | Contact Us
©2001 by Swiss Re All rights reserved Please send comments
or suggestions to FacEasy.com Administrator

Figure 14

FacEasy.com Fax Transmission
Instructions: Please print this page and fax to:

Date: 4/25/01

\*\*\*\*\*\*\*\*To\*\*\*\*\*\*\*\*\*        \*\*\*\*\*\*\*\*From\*\*\*\*\*\*\*\*

Company: Swiss Re Life & Health    Name: John Does
Phone: 203-321-3115                Company: JCM Insurance
Fax: 203-321-3225                  Unit: Stamford
                                           Phone: 123-123-4567
                                           Fax: 123-123-4567

Number of pages including cover sheet: _____

RE: Submission #446
The following information was submitted via FacEasy.com:

| | |
|---:|:---|
| Patient Name: | Suzanne P Webber |
| D.O.B.: | 08/10/1970 |
| Amount: | 987654321 |
| Policy Number: | $5,000,000.00 |
| Place of Birth: | AL |
| Residence: | AB |
| Sex: | Female |
| Tobacco: | No Tobacco Use |
| Family History: | One parent or sibling under 60 |
| Cholesterol/HDL: | <3.0 |
| Build/BP Normal: | Build and blood pressure acceptable |
| MIB Authorization: | Yes |
| Comments: | |

Figure 16

FacEasy                                                    Swiss Re Life

Submission #447

Voice Channel - if you wish to add addition comments, please do so in the comment
box below. Otherwise, leave blank, and click continue.

John Does
JCM Insurance
45 Main Street
Avon, CT 06001

T: 123-123-4567 Ext.
F: 203-456-7890
thomas_mccarthy@swiss

| Patient Name: | Debra Dollie |
|---|---|
| D.O.B.: | 09/08/1945 |
| Amount: | 32456788 |
| Policy Number: | $1,000,000.00 |
| Place of Birth: | AL |
| Residence: | DE |
| Sex: | Female |
| Tobacco: | Smokeless Tobacco |
| Family History: | Two of more than 2 parents and/or siblings under 60 |
| Cholesterol/HDL: | 4.6 - 6.0 |
| Build/BP Normal: | Both Unknown |
| MIB Authorization: | No |

Comments:

[text box] — 1705

[Continue -->] — 1710

FAQ's | Contact Us
©2001 by Swiss Re All rights reserved Please send comments
or suggestions to FacEasy.com Administrator

Figure 17

FacEasy.com Voice Summary
Instructions: Please print this page and contact:

Date: 4/25/01

| Organization Name | Address | Phone | Fax |
|---|---|---|---|
| JCM Re Company | 20 Avon Meadoew Lane<br>Avon, CA 06089 | 321-654-9874<br>Ext. 12 | 321-654-6547 |
| Swiss Re Life & Health | 969 High Ridge Rd<br>Stamford, CT 06905 | 203-321-3115 | 203-321-3225 |

Submitted Summaries

Search for a case by choosing one of the options below, and clicking the Go! Button. Default is "all"

● Show All Current Submissions
○ By Submission Number
○ By Last Name
○ Show All Hidden Submissions

[Go -->]

2210

2205

Jane Doe
JCM Insurance
20 Avon Meadoew Lane
Avon, CA 06089

T: 123-123-4567 Ext.
F: 123-123-4567
thomas_mccarthy@swissre.com

[Log Out]

Query Results by All

| Sub#: | Channel: | Date/Time: | Policy $ | Last Name: | Submitted by: | Last viewed by: | View |
|---|---|---|---|---|---|---|---|
| 444 | E | 4/25/01 5:27:40 PM | $1,000,000.00 | Webber | JCM Insurance John Does | | View |
| 442 | E | 4/25/01 5:02:50 PM | $4,569,845.00 | Loparco20 | JCM Insurance John Does | | View |
| 441 | E | 4/25/01 4:50:51 PM | $456.00 | Loparco19 | JCM Insurance John Does | | View |
| 439 | E | 4/25/01 4:12:48 PM | $99,945,677,777,777.00 | Loparco18 | JCM Insurance John Does | | View |
| 438 | E | 4/25/01 4:09:32 PM | $175,000.00 | Cash | JCM Insurance John Does | | View |
| 437 | E | 4/25/01 4:03:18 PM | $5,000,000.00 | Loparco17 | JCM Insurance John Does | | View |
| 436 | E | 4/25/01 3:58:24 PM | $67,889.00 | Loparco16 | JCM Insurance John Does | | View |
| 435 | E | 4/25/01 3:53:23 PM | $400,000.00 | Lee | JCM Insurance John Does | | View |
| 434 | E | 4/25/01 3:50:05 PM | $50,000.00 | Rye | JCM Insurance John Does | | View |
| 432 | E | 4/25/01 3:44:15 PM | $888,888.00 | Loparco15 | JCM Insurance John Does | | View |
| 431 | E | 4/25/01 3:36:38 PM | $666,667.00 | Loparco14 | JCM Insurance John Does | | View |
| 430 | E | 4/25/01 3:12:18 PM | $444,444.00 | Loparco13 | JCM Insurance John Does | | View |
| 429 | E | 4/25/01 3:00:10 PM | $1,000,000.00 | Thomas | JCM Insurance John Does | | View |

Figure 22B

| | | | | | |
|---|---|---|---|---|---|
| 424 | E | 4/25/01 2:20:05 PM | $999,999.00 | Loparco12 | JCM Insurance John Does | View |
| 423 | E | 4/25/01 2:12:05 PM | $555,555.00 | Loparco11 | JCM Insurance John Does | View |
| 420 | E | 4/25/01 1:57:07 PM | $500,000.00 | Loparco10 | JCM Insurance John Does | View |
| 419 | E | 4/25/01 1:43:23 PM | $2,500,000.00 | Loparco9 | JCM Insurance John Does | View |
| 418 | E | 4/25/01 1:39:36 PM | $100,000.00 | Hancock | JCM Insurance John Does | View |
| 417 | E | 4/25/01 1:28:15 PM | $20,000,000.00 | Bach | JCM Insurance John Does | View |
| 416 | E | 4/25/01 1:20:25 PM | $3,000,000.00 | Mullen | JCM Insurance John Does | View |
| 415 | E | 4/25/01 1:17:27 PM | $2,500,000.00 | Newburg | JCM Insurance John Does | View |
| 414 | E | 4/25/01 1:12:59 PM | $250,000.00 | Tim | JCM Insurance John Does | View |
| 413 | E | 4/25/01 1:11:00 PM | $40,000.00 | landry | JCM Insurance John Does | View |

Figure 22C

| C | | | | | | | D |
|---|---|---|---|---|---|---|---|
| 412 | E | 4/25/01 1:05:30 PM | $150,000.00 | Loparco8 | JCM Insurance John Does | Jane Doe | View |
| 411 | E | 4/25/01 11:55:22 AM | $110,000.00 | Bush | JCM Insurance John Does | | View |
| 410 | E | 4/25/01 11:42:32 AM | $25,000.00 | Loparco7 | JCM Insurance John Does | Jane Doe | View |
| 409 | E | 4/25/01 11:37:23 AM | $1,000,000.00 | Loparco6 | JCM Insurance John Does | | View |
| 407 | E | 4/25/01 11:13:47 AM | $40,000,000,000,000.00 | Gregory | JCM Insurance John Does | | View |
| 406 | E | 4/25/01 11:06:21 AM | $10,000,000.00 | Does | JCM Insurance John Does | Jane Doe | View |
| 404 | E | 4/25/01 11:00:06 AM | $ | Pilot | JCM Insurance John Does | | View |
| 394 | E | 4/25/01 9:51:20 AM | $600,000.00 | Iou | JCM Insurance John Does | Jane Doe | View |
| 392 | E | 4/25/01 9:30:40 AM | $1,000,000.00 | Loparco | JCM Insurance John Does | Jane Doe | View |
| 391 | E | 4/25/01 9:23:03 AM | $4,000,000.00 | Pilot | JCM Insurance John Does | | View |
| 390 | F | 4/25/01 9:15:40 AM | | Kochman | JCM Insurance John Does | Jane Doe | View |
| 389 | E | 4/25/01 8:57:53 AM | $1,000,000.00 | McCarthy | JCM Insurance John Does | | View |

Figure 22D

| D | | | | | D |
|---|---|---|---|---|---|
| 388 | F | 4/24/01 10:44:36 PM | | smith | JCM Insurance John Does | View |
| 375 | V | 4/24/01 12:00:59 PM | $4,000,000.00 | jim | JCM Insurance John Does | Jane Doe | View |
| 374 | F | 4/24/01 11:59:58 AM | | house | JCM Insurance John Does | Jane Doe | View |
| 373 | F | 4/24/01 11:56:41 AM | | house | JCM Insurance John Does | Jane Doe | View |

Figure 22E

| | |
|---|---|
| | Swiss Re Life |
| | Summary Details |
| Jane Doe | Case #444 |
| JCM Insurance | |
| 20 Avon Meadoew Lane | |
| Avon, CA 06089 | |
| T 123-123-4567 Ext | |
| F 123-123-4567 | |
| thomas_mccarthy@swissre.com | |

| | |
|---|---|
| Submitted By: | John Does - JCM Insurance<br>123-123-4567 |
| Submit Date: | 4/25/01 5:27:40 PM |
| Patient Name: | Suzanne P Webber |
| D.O.B.: | 1/6/51 |
| Sex: | Female |
| Amount: | 12345678 |
| Policy Number: | $1,000,000.00 |
| Tobacco: | Cigarettes |
| Family History: | Two of more than 2 parents and/or siblings under 60 |
| Cholesterol/HDL: | <3.0 |
| Build/BP Normal: | Build and blood pressure acceptable |
| MIB Authorization: | Yes |
| Comments: | |
| Submit Type: | Electronic Summary |
| Impairments: | |
| Alcohol and Drug Treatment: | History of relapses?: None |
| Alcohol and Drug Treatment: | Drugs used?: Cannabis |
| Alcohol and Drug Treatment: | What type of substance abuse was treated?: Alcohol |
| Alcohol and Drug Treatment: | Type of treatment?: Outpatient |
| Alcohol and Drug Treatment: | Additional modifiers and factors:: Active in AA or simila |
| Alcohol and Drug Treatment: | Time since treatment completed?: Over 4 years ago |
| Alcohol and Drug Treatment: | Time since last relapse?: Over 4 years ago |
| Alcohol and Drug Treatment: | Number of Years abstinent from alcohol or Drug-Free ago |
| Alcohol and Drug Treatment: | Current Alcohol Use?: None |
| Alcohol and Drug Treatment: | Additional comments?: |

[Return to Submitted Summaries]  [Log Out]
2305                                 2310

FAQ's | Contact Us
2001 by Swiss Re All rights reserved Please send comments
or suggestions to FacEasy.com Administrator

Figure 23

| | Summary Details |
| --- | --- |
| Jane Doe<br>JCM Insurance<br>20 Avon Meadoew Lane<br>Avon, CA 06089<br><br>T 123-123-4567 Ext<br>F 123-123-4567<br>thomas_mccarthy@swissre.com | Case #444 |

| | |
| --- | --- |
| Submitted By: | John Does - JCM Insurance<br>123-123-4567 |
| Submit Date: | 4/25/01 5:27:40 PM |
| Patient Name: | Suzanne P Webber |
| D.O.B.: | 1/6/51 |
| Sex: | Female |
| Amount: | 12345678 |
| Policy Number: | $1,000,000.00 |
| Tobacco: | Cigarettes |
| Family History: | Two of more than 2 parents and/or siblings under 60 |
| Cholesterol/HDL: | <3.0 |
| Build/BP Normal: | Build and blood pressure acceptable |
| MIB Authorization: | Yes |
| Comments: | |
| Submit Type: | Electronic Summary |
| Impairments: | |
| Alcohol and Drug Treatment: | History of relapses?: None |
| Alcohol and Drug Treatment: | Drugs used?: Cannabis |
| Alcohol and Drug Treatment: | What type of substance abuse was treated?: Alcohol |
| Alcohol and Drug Treatment: | Type of treatment?: Outpatient |
| Alcohol and Drug Treatment: | Additional modifiers and factors:: Active in AA or simila |
| Alcohol and Drug Treatment: | Time since treatment completed?: Over 4 years ago |
| Alcohol and Drug Treatment: | Time since last relapse?: Over 4 years ago |
| Alcohol and Drug Treatment: | Number of Years abstinent from alcohol or Drug-Free ago |
| Alcohol and Drug Treatment: | Current Alcohol Use?: None |
| Alcohol and Drug Treatment: | Additional comments?: |

[ Return to Submitted Summaries ]　　　　　　　　　　　　　　[ Log Out ]
　　　　　　　2405　　　　　　　　　　　　　　　　　　　　　2410

Figure 24

FACULTATIVE UNDERWRITING SYSTEM AND METHOD

FIELD OF THE INVENTION

The present invention relates to underwriting of life insurance policies and in particular, to a method and system for receiving facultative case summary information over a network as part of a reinsurance transaction.

DESCRIPTION OF RELATED ART

In a reinsurance transaction, an insurer (ceding company) purchases reinsurance to cover all or part of the risks that it does not want to retain in full. Reinsurance can be automatic (handled completely by the ceding company) or facultative (wherein the ceding company shares the decision making process with the reinsurer on an individual case basis). Facultative reinsurance has not really evolved much over the years. It is still the same basic process developed years ago. The facultative process involves the ceding company underwriting a case themselves, and in turn sending the complete file to multiple reinsurers (reinsurance companies) who re-underwrite the same case and render a facultative reinsurance decision. Often there is no communication between the ceding company and the reinsurer.

Traditionally, when submitting information as part of a facultative reinsurance transaction, a copy of the complete file is provided by the ceding company to the reinsurer for review prior to making a facultative decision. Because of the number of documents to be reviewed, typically the reinsurance company requires two, three or more days to review the entire case file prior to rendering their facultative decision.

AgoraRe.com is a web site that provides a central location where direct writers and reinsurers can meet, share information and conduct business. Transactions are streamlined by entering the complete file electronically only once. The complete file in electronic form may then be forwarded to multiple reinsurers quickly and accurately. However, even this streamlined processed is still relatively inefficient in that the reinsurer must examine the complete electronic file or case submission prior to rendering a decision.

In order to reduce the period before which a decision is rendered, it is desirable to reduce the amount of documentation wherein less than the complete file need be reviewed by the reinsurer. Heretofore, decisions based on case summary information has only been available for a particular reinsurer, thus no system or method exists for submitting case summary information to a single system that would allow access to a multitude of reinsurers.

Heretofore it has been commonly believed that due to the complexity in establishing a predetermined set of factors or criteria to evaluate the risks in offering a life insurance policy, no system was therefore offered whereby case summary information is submitted once while receiving quotes from multiple reinsurance companies.

It is therefore desirable to develop a network based life insurance facultative underwriting case summary submission system in which a case may be submitted to multiple reinsurers for review that render a facultative decision based on predetermined salient summarized criteria thereby eliminating conventional review of a complete set of the case documents.

SUMMARY OF THE INVENTION

An object of the present invention is to provide a facultative underwriting case summary submission system.

Another object of the present invention is to provide a facultative underwriting system wherein case summary submissions may be received from underwriters via different transmission channels.

Still another object of the present invention is to provide a facultative underwriting system that is more efficient in that only case summary information need be reviewed before the reinsurance company renders its facultative decision thereby reducing the number of documents that each reinsurance company must examine.

Yet another object of the present invention is to provide a facultative underwriting system and method that allows the reinsurer to render a facultative decision within hours instead of days.

While another object of the present invention is to provide a facultative underwriting system and method which requires less staff to review the case files in determining whether to offer an underwriting policy to the ceding company.

It is yet another object of the present invention to provide a facultative underwriting system and method that is adaptable to the existing technological capabilities of each ceding company.

The present inventive case summary facultative underwriting system and method dispels the previously accepted notion that every document in the case history must be reviewed before rendering a facultative decision.

The present invention is a system and method for a ceding company to submit case summary information over a network for review by one or more reinsurers thereby increasing consistency, providing faster review, and greater convenience for underwriters of the ceding company.

The method in accordance with the present invention is for processing a life insurance facultative case summary submission over a network between a ceding company and a reinsurer. Initially, a facultative case summary submission is received by the reinsurer from the ceding company via the network. Thereafter, a facultative decision is rendered by the reinsurer based on the received facultative case summary submission. Because the information is summarized and sent electronically or via voice message, less information is processed in a faster period of time thereby rendering quicker decisions than when the complete case history is submitted to the reinsurer for review.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which:

FIG. 3 is an exemplary Type of Submission screen;

FIG. 4 is an exemplary Initial Summarized Data Capture screen;

FIG. 5 is an exemplary Preliminary Data Capture screen;

FIG. 6 is an exemplary Channel Selection screen;

FIG. 7 is an exemplary Electronic Text Summary screen;

FIG. 8 is an exemplary Drop Down Impairments Selection screen;

FIG. 9 is an exemplary Drop Down Impairment Questionnaire for an Alcohol and/or Drug Treatment impairment;

FIG. 10 is an exemplary Results Drop Down Impairment screen;

FIG. 11 is an exemplary Imaged File Summary screen;

FIG. 13 is an exemplary Fax Channel screen;

FIG. 14 is an exemplary Fax Channel Confirmation screen;

FIG. 16 is an exemplary Fax Transmission Cover Sheet;

FIG. 17 is an exemplary Voice Channel screen;

FIG. 19 is an exemplary Voice Summary Contact Sheet;

FIG. 21 is an exemplary Preliminary Data Capture screen for additional papers and/or supplemental information;

FIG. 22 is an exemplary Reinsurance Summary Information screen;

FIG. 23 is an exemplary Reservation of Facilities screen; and

FIG. 24 is an exemplary View Summary Details screen for case submission number 444.

DETAILED DESCRIPTION OF THE INVENTION

It has been recognized that in a facultative life reinsurance transaction the reinsurer's facultative decision may be based on certain salient features, that when summarized effectively, eliminate the need to review the complete file while maintaining the trust and confidence of the reinsurers to render a decision based on this restricted set of information.

Figure 1:
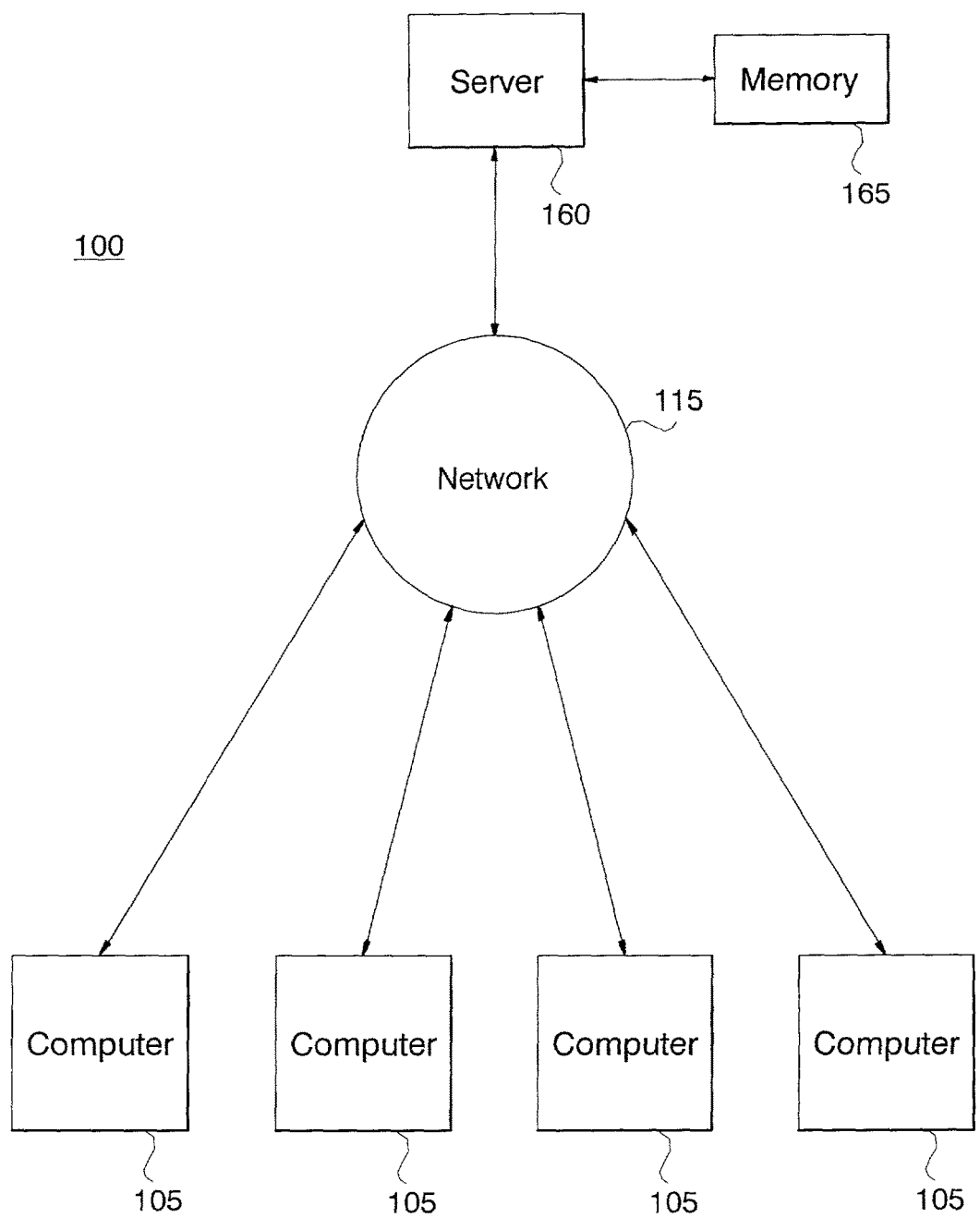
FIG. 1 is an exemplary high level diagram of the life insurance case summary facultative underwriting system in accordance with the present invention.

FIG. 1 is an exemplary high level diagram of the case summary facultative underwriting system 100 in accordance with the present invention. One or more computer terminals 105 are electronically connected to the server 110 via a network 115, such as the Internet, intranet, World Wide Web, Local Area Network (LAN), or Wide Area Network (WAN). System 100 includes a server 160 that is used to run the software applications necessary for creating, completing, processing, storing and displaying a survey and the results thereof. The software applications and information received from the ceding companies are stored in an associated memory device 165, which comprises one or more storage elements, such as a RAM and a hard disk (not shown). Although the processor and associated memory device are shown in FIG. 1 as two separate elements, it is contemplated and within the scope of the invention for the two elements to be integrated into a single unit.

Although only four computers are shown, any number of computers 105 may be connected to the network through known communication interface means, such as a broadband connection through a LAN, normally a T1 or T3 line. While access is available through any connectivity, even a modem, faster connection speeds are normally a prerequisite to move data efficiently. Ceding company and reinsurer end users may access the system from any computer terminal throughout the world having appropriate network access and software, such as a web browser. End users access the system by visiting the secure web site.

The screen shots of the different pages are by illustrative example only and are not meant to be limiting in any way. Clearly, the page layout may be designed, as desired, without departing from the scope of the invention. In addition, the use of data entry fields, drop down menus, buttons, icons, or any other means for selecting or entering information may be interchanged, as desired.

Figure 2:
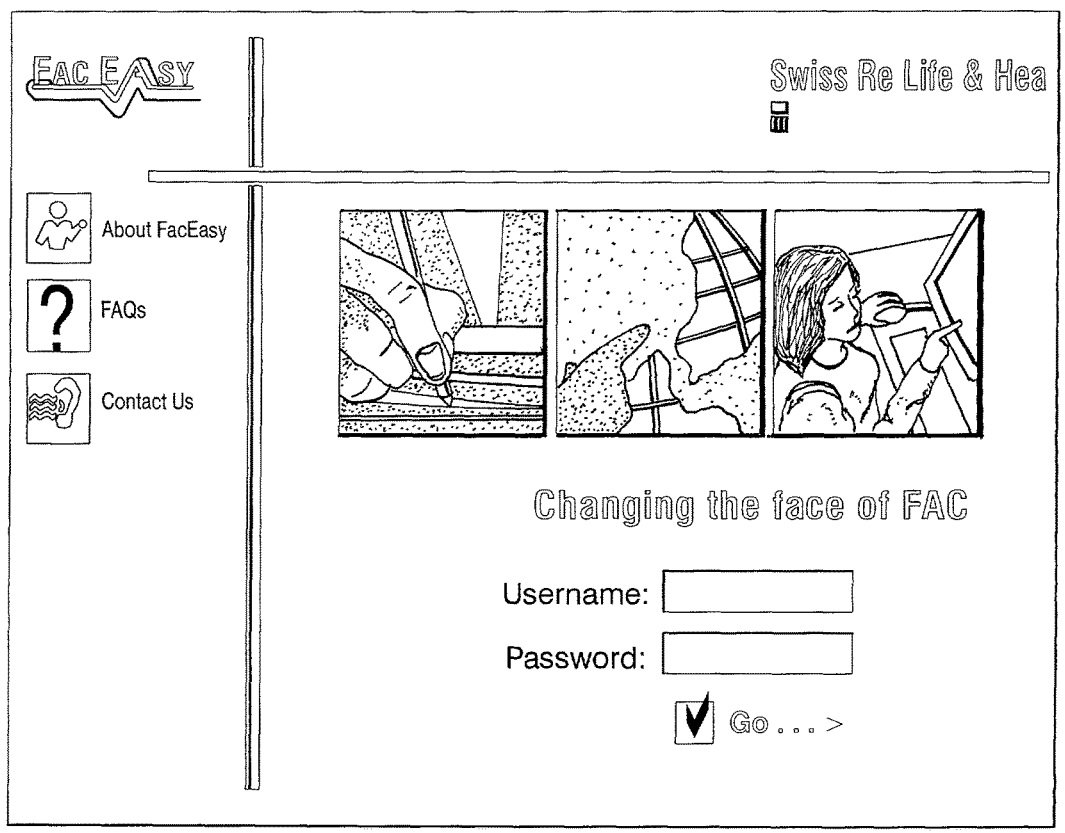
FIG. 2 is an exemplary login screen display.

FIG. 2 is an exemplary login screen. When visiting the web site a login screen is automatically generated prompting previously registered users to enter their existing username and password. Otherwise, new users are instructed to register by setting up a username, password, and providing bibliographic information. The registration procedure used to verify the user prior to accessing the web site may be configured and designed, as desired. Each ceding company and reinsurer preferably will assign an administrator to handle addition and maintenance of all users associated with that particular company.

The username and password entered the system determines whether the user is a ceding company or a reinsurer and automatically generates the appropriate screen displays. This is preferably accomplished using Active Server Pages (ASP) or similar technology. In particular, users associated with a ceding company are guided to generated case summary information pages, while users associated with a reinsurance company are directed to reinsurance summary information view screens. One way secure transmission of case summary information occurs over the network 115. Once a summary is submitted, the ceding company is neither able to recall or view information submitted by that company, nor is the ceding company able to view information concerning cases filed by other ceding companies. Likewise, reinsurance company users are only permitted access to the reinsurance summary information view screens or pages of those cases in which they were designated. In the embodiment described herein, reinsurers communicate through normal channels with the ceding company not through web site which serves merely as a posting site. It is, however, contemplated and within the intended scope of the invention to modify the system so that the reinsurers may communicate with the ceding company through the web site.

I. Ceding Company

When the user that has logged in is associated with a ceding company, a new screen is generated whereby the type of case to be submitted is identified. By way of example, FIG. 3 is an exemplary Type of Submission screen providing the ceding company with one of four different possible options. From top to bottom, the first icon or button 305 represents a summarized individual case whereby the ceding company provides case summary information for an individual that has not previously been presented. The second option identified by button 310 is to submit additional papers or supplemental information on a previously submitted traditional case (a case in which a complete documentation of the case is submitted) or a summarized case (in which only case summary information is submitted). The third option in the Case Identification screen is the summarized joint case button 315 for submitting information for joint cases. A last option is to make a reservation of facilities by selecting icon 320. This option allows a ceding company to in effect prepare for the possible later submission of a facultative case. The reservation sets aside the reinsurers capacity or reinsurance ability fro the ceding company.

A. New Individual Case Summary Information

After selecting button 305 to submit a new case summary information for an individual case, a new Initial Summarized Data Capture screen is generated in which the ceding company is prompted to provide enough basic data on the individual life to allow the reinsurers to set-up the facultative case and run a Medical Information Bureau (MIB) and alpha search. MIB is a non-profit clearing house that all insurers and reinsurers use on to determine whether an individual has a pre-existing adverse insurance history. An alpha search is search of a ceding company's or reinsurer's internal records to determine if prior coverage had previously been issued to the same individual. In particular, the Initial Summarized Data Capture screen includes basic information such as name of the individual life, the policy number, amount of the insurance policy, date of birth, place of birth, residence, sex and whether they engage in tobacco use in the appropriate data entry fields 410-445.

Data entry fields 450-460 are directed to pertinent risk factor information that may affect the health of the individual being reinsured, such as their range of cholesterol/HDL level, their build, and blood pressure level. By way of example the data entry fields with respect to risk factor information are in the form of drop down menus, however, any other type of data entry technique may be used. The user identifies in field 465 whether a signed and dated MIB authorization and pre-notice was present.

At the bottom of Initial Summarized Data Capture screen, the ceding company is prompted to select in data entry section 470 one or more reinsurance companies from those identified with whom to submit the case summary information. By way of example, two companies are identified, however, any number of one or more reinsurance companies can be listed. This time saving feature allows the ceding company to submit the case summary information a single time to be simultaneously evaluated by multiple reinsurance companies. Once the information has been submitted the user selects "Go" icon 475 to process the information.

The next screen generated is the Preliminary Data Capture screen an example of which is shown in FIG. 5. This screen captures the responses entered by the ceding company in response to the Initial Summarized Data Capture screen in FIG. 4. The user is able to review the accuracy of the information previously entered in FIG. 4. Editorial changes to the previously entered information may be made by selecting "Go" button 505 at the top of the page. Otherwise, if all information is accurately entered, the user proceeds to the next screen by selecting "Go" button 510 at the bottom of the page.

Once a user confirms data, the previously compiled data is preferably "hidden" to reduce the amount of information to be viewed. Hidden data may be recalled at any time by clicking on the "Show Details" icon. A special pop-up box will be generated showing data compiled to data on the case. This "Show Details" icon will continue to be present throughout the entire transaction.

A Channel Selection screen is next generated, as shown by way of example in FIG. 6. In addition to displaying the information entered by the ceding company a unique Submission Number is assigned to each case. In FIG. 6 the particular case has been assigned "Submission #444". Below the table of initial data previously entered by the ceding company is a list of three possible transmission channels from which the ceding company uses to submit the case summary information. In the preferred embodiment provided in FIG. 6, the transmission channel options each have an associated button or icon, that is, electronic summary icon 605, fax summary icon 610, and voice summary icon 615. The ceding company may use one or more of the transmission options to submit the case summary information to the reinsurance companies.

1) Electronic Summary

The electronic summary transmission channel is a compilation of three electronic methods of submission of summarized case information, via electronic text, drop down impairment menus, and uploading of electronic files. A user may use one or more of these methods of electronic submission. In a preferred embodiment shown and described herein, each of the three methods of electronic submission are sequenced through in the order specified above. If any of these methods of transfer is not employed, it may be skipped over by the user. The order in which the methods of electronic submission are arranged to be sequenced through or the fact that each method is automatically sequenced through may be modified, as desired, as would be evident by one of skill in the art.

In response to the user selecting the Electronic Summary icon 605 the Electronic Summary page shown in FIG. 7 is generated. Once again the initial data previously entered is displayed at the top of the page in table form. Below the table is a large data entry field 705 into which text may be typed in directly. Alternatively, or in addition thereto, blocks of text that has been cut or copied from an existing electronic file may be pasted into the data entry field. After the desired text has been entered in the data entry field 705, in response to the user selecting the "Continue" button 710 the information is processed and the next screen is generated. If at any time case summary information is not being submitted via a particular form of electronic transmission (e.g., electronic summary, fax summary, or voice summary) that particular method may be skipped over by choosing the "Skip This Step" icon to advance to the next form of transmission.

In addition to, or instead of, pasting text from another electronic file the ceding company can make selections from a series of drop down impairment menus, as shown in FIG. 8. The drop down impairment menus are advantageous in several respects. In one respect the drop down menus provide a quick summarization of salient impairment factors and their description, severity, complications, test results, etc. Another advantage is that the menus serve as an unofficial final checklist of critical factors relating to individual impairments for underwriters summarizing impairments from a variety of file data (e.g., laboratory results, examination findings, Attending Physician Statement reports). Furthermore, the drop down menus provide a useful training tool for less experienced underwriters in analyzing impairments for critical pieces of information. Consistency is yet another advantage provided by the impairment menus in that submissions among multiple reinsurers are more consistent.

Drop down impairment menus are automatically created in response to the user selecting the "Continue" button 710 or "Skip This Step" button 715 in FIG. 7. Below the initial data previously entered is a high level impairment drop down menu 805. In a preferred embodiment the drop down impairment menu 805 allows the ceding company to select one impairment from a predetermined list. By way of example, drop down impairments are categorized into non-medical impairments and medical impairments. Non-medical impairments, for example, may include: Auto Racing, Aviation (paid), Aviation (private), Diving, Driving, Motor Cycle Racing, Extreme Sports, and Foreign Risks. Medical impairments, for example, may include: Alcohol and/or Drug Treatment, Blood Pressure, Build, CAD Revascularization, Cancer of the Eladder, Cancer of the Ear, Cancer of the Eye, Cancer of the Intestines, Cancer of the Prostate, Cancer of the Testis, Cardiac Vascular Surgery, CABG, PTCA Pyuria, Intestinal Polyps, Stroke, Transient Ischemic Attack, Breast Cancer, Gynecological Cancer, Thyroid Cancer, COPD, Depression, Myocardial Infarction, Angina, Anxiety, Head and Neck Cancer, Lung Cancer, Renal Cancer, Leukemia, Lymphoma, Cerebrovascular Accident, Colon Polyps, Diabetes Mellitus, Epilepsy, Heart Murmur(s), Hematuria, Hepatitis B, Hepatitis C, Inflammatory Bowel Disease, Lipids, Liver Enzyme Elevations, Melanoma, Obstructive Sleep Apnea, Peripheral Vascular Disease, Proteinuria, and PSA Elevations. Over time, additional impairments may be added and/or existing impairments may be modified in response to anticipated needs and user requests.

In response to the user making an impairment selection and clicking the "Go" button 810, the server processes the response and generates the next page. Like the other electronic methods, the user may forego selection of an impairment from the drop down menu by choosing "Skip This Step" icon 815 and proceeding immediately to the next page.

Each impairment in the drop down menu 805 has a series of associated questions that are automatically displayed in the next page in response to the selection of that impairment from menu 805. By way of example, FIG. 9 is an exemplary Supplementary Questionnaire screen 900 displayed in response to selection of the Alcohol and/or Drug Treatment impairment from drop down menu 805 in FIG. 8. As with the previously described screens, the initial data previously entered is displayed along with additional questions to be answered with respect to the alcohol and/or drug treatment. Because the impairment questionnaire is not exhaustive, a comments data entry field 910 is preferably included to allow the user to provide additional information for a particular impairment. User's may edit or correct previously entered selections or information in the drop down impairment menu.

The questions and their possible answers may be selected and arranged, as desired, without departing from the scope of the present invention. After entering the responses to the specified questions the user selects "Submit" button 905. The user's responses are processed by the server which, in turn, generates a Results of Drop Down Impairment screen as shown in FIG. 10. The results displayed include the questions and associated answers provided in response thereto for the impairment selected. At this point another impairment may be selected from the drop down impairment menu 905 at the bottom of the screen. Otherwise, if all impairments have been entered the server in response to the user clicking on the "Next Step" icon 1010 (FIG. 10) generates an Imaged File Summary screen, as shown in FIG. 11, to upload an electronic image file or document. Data entry field 1105 is used to enter the location of the electronic image file or document to be uploaded similar to the technique used to attach an electronic file to an e-mail message. Alternatively, the user may click on the "Browse" icon 1105 to locate the electronic image file or document by browsing through their network or hard drive and selecting the files of interest. Electronic files to be uploaded preferably are restricted to include only summarized information such as EKG tracings, pathology reports, and sections of APS reports, in keeping with the time saving process of reviewing only summarized case information. Once located, the user selects "Go" icon 1115 to process the request. Similar to the previous electronic image summary screens, the user may skip the step of uploading an electronic image file or document by choosing "Finalize Your Submission" button 1110. The "Show Details" icon may be selected to display the compiled summary results for verification before submission.

Figure 12:
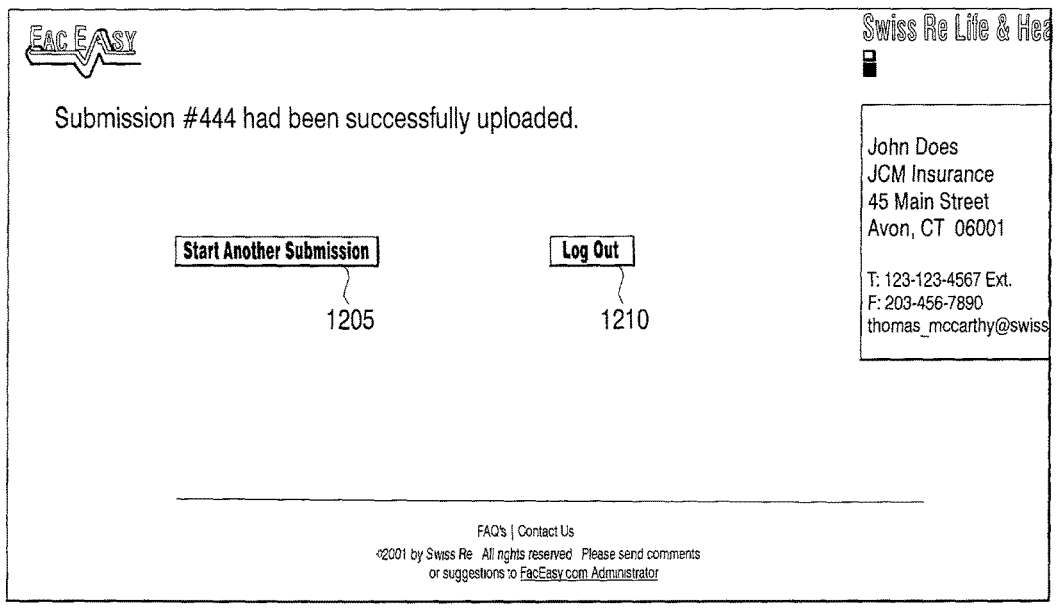
FIG. 12 is an exemplary Confirmation of Successful Loading screen.

FIG. 12 is an exemplary screen that is generated by the server to confirm that the electronic image or file has been successfully uploaded. At this point another case submission may be entered by selecting "Start Another Submission" icon 1205, or the user may sign off by clicking on "Log Out" button 1210.

2) Fax Summary

Figure 15:
FIG. 15 is an exemplary Fax Summary screen.

Case summary information may also be transmitted to the reinsurers via facsimile. After the server has sequenced through the different types of electronic summary transmission, the next screen to be generated is that representing the facsimile summary channel. FIG. 13 is an exemplary Fax Channel screen generated by the server. The initial data previously entered is once again displayed at the top of the screen in table form. A data entry field 1305 is provided at the bottom of the page for receiving the user's comments to be inserted in the fax cover sheet to be transmitted along with the documentation. In response to the user clicking on "Continue" button 1310 the server generates a new page screen FIG. 14 with the previously entered comments of the user to be confirmed prior to transmission of the summary information to the reinsurers. In response to the user clicking on "Continue" button 1405, a Fax Cover Sheet Generation screen, such as that shown by way of example in FIG. 15, is created. By ways of example, only one reinsurer is listed, however, any number of one or more reinsurers can be identified depending on how many have been selected by the user. Clicking on the fax icon in the "Generate Form" column of the table invokes programming in the server to generate a fax cover sheet for the reinsurer selected. An exemplary fax cover sheet for the Swiss Re Life & Health reinsurance company is shown in FIG. 16. This page is preferably printed out by the user and submitted as the cover sheet with the case summary information to be submitted via facsimile to the reinsurer.

The fax summary channel advantageously sends a pre-notification message to the intended reinsurers to inform them of documentation that will follow shortly via facsimile. Upon accessing the web site, the reinsurer is notified that a case has been submitted for their review. The initial data may be utilized by the reinsurer to set up the file in their database system and await the additional data transmitted by conventional channels. Accordingly, the case set-p with MIB and alpha search can be processed by the reinsurer prior to receiving the summary. Initial data entered by the ceding company is automatically reproduced on the fax cover sheet to be submitted with the summary information. The facsimile number of the reinsurer is automatically printed out on the fax cover sheet. A specific facsimile number may be provided in order to segregate incoming summarized case data from routine complete case summary submissions.

3) Voice Summary

Figure 18:
FIG. 18 is an exemplary Voice Channel Confirmation screen.

The last transmission channel available to the user of the ceding company is Voice Summary. An exemplary Voice Channel Submission screen is shown in FIG. 17. The initial data previously entered is provided once again in table format at the top of the page. Below the table is a "Comments" data entry field 1705 in which the user may enter additional information. In response to the user clicking on "Continue" button 1710, the server generates a Voice Confirmation screen, such as that shown in FIG. 18. Thereafter, in response to the user selecting the "Finalize Your Submission" button 1805, a Voice Summary Contact Sheet, as for example shown in FIG. 19, is generated by the server. The contact sheet includes a listing of each reinsurer selected by the user along with their respective address, phone number and facsimile number.

When the voice summary channel is selected a pre-notification message is sent to all reinsurers that summarized data will follow shortly via telephone. Once again this provides the reinsurer with the opportunity to set up the case with MIB and alpha search processing prior to receiving the summary information. Initial data need only be spoken once and submitted to multiple reinsurers. A voice summary sheet is automatically generated that includes the initial data previously entered as well as the contact information for each of the specified reinsurers. Reinsurers can set up a dedicated telephone line to receive only voice summary submissions. Phone calls to the reinsurer conventionally were only used to receive opinion, but using the system in accordance with the present invention may be used to render facultative decisions.

B. Additional and/or Supplemental Documentation for Individual Case Summary

Figure 20:
FIG. 20 is an exemplary Initial Summarized Data Capture screen for the submission of additional papers and/or supplemental information.
Figure 21:
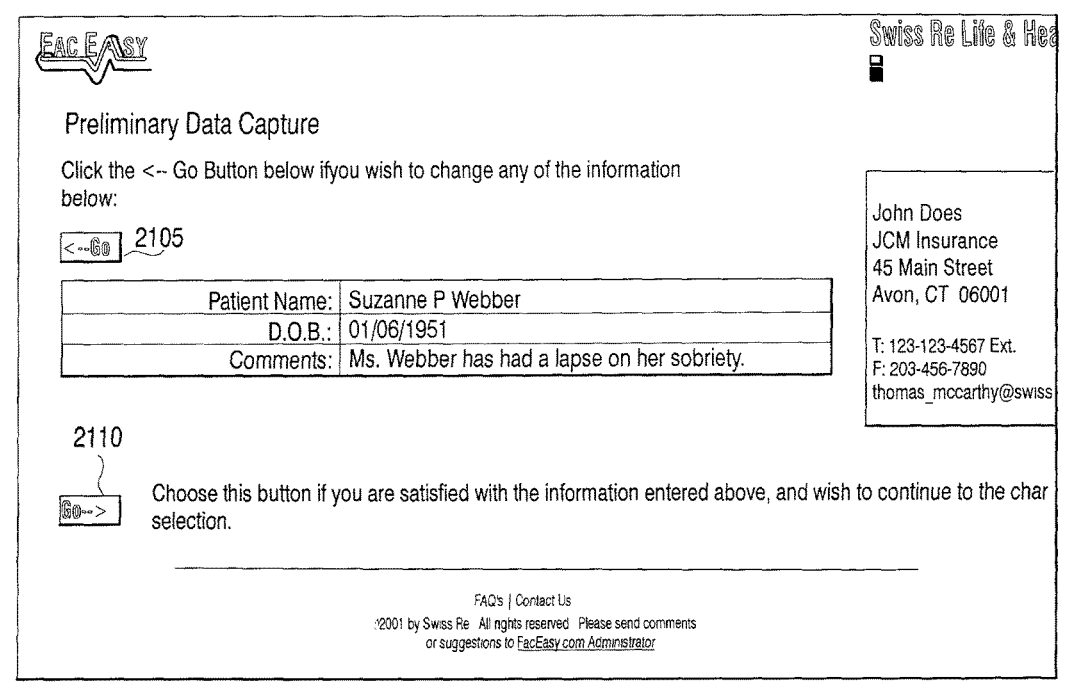

Additional papers and/or supplemental information may be forwarded to the reinsurance companies and matched up with previously provided case information. A case need not have been submitted on a summarized basis for the ceding company to submit additional papers or supplemental information using the system in accordance with the present invention. Referring to FIG. 3, in response to the user selecting the icon associated with the submission of additional papers or supplemental information, server 160 generates a new screen, such as that shown in FIG. 20. The insurer for which the additional papers and/or supplemental information is being submitted is readily identified by entering their name and date of birth in data entry fields 2005 and 2010, respectively. A "Comment" data entry field 2015 is preferably provided to allow the user to enter particulars with respect to the individualized summary information. Similar to the Case Identification Screen in FIG. 3, FIG. 20 includes a data entry section 2020 in which the user selects one or more reinsurers to whom the additional papers and/or supplemental information is to be forwarded. This information may be transmitted to more than, less than, or the same original group of reinsurers to whom the underlying data information was sent, as the situation warrants. The additional information is then displayed on a Preliminary Data Capture screen, such as that shown in FIG. 21, so that the user may confirm the accuracy of the information prior to submission. If correct, the information is processed in response to the user selecting "Go" icon 2110.

C. Joint Case Summary

Aside from submitting information with respect to an individual life the ceding company may submit multi-life cases to the reinsurer for review. By way of example, the figures and description describe submission of a joint case for two individuals, however, it is within the intended scope of the invention to submit case summary information for any number of one or more lives.

The joint case summarization process is similar to the individual cases described above. Each case is entered separately and then submitted as one overall joint case to the reinsurance companies selected by the ceding company. Specifically, the first life is the summarized case that is processed in accordance with the description provided above. At the completion of the summarization of the first life, the user is prompted with a selection of options with regard to the information for the second life. FIG. 22 is an example screen presenting the different options as to how to submit the information for the second life. The available options include:

i) second life is standard and no papers are being submitted;
ii) second life is preferred and no papers are being submitted;
iii) second life is a decline and no papers are being submitted;
iv) second life is impaired and the case will be submitted on a non-summarized basis by sending the complete file through the conventional full facultative process; or
v) second life is impaired and the case will now be submitted on a summarized basis.

In a preferred embodiment, the user must select one of the options for submission of the information for the second life in order to process the joint case. If the user fails to complete the data with respect to the second life, any data submitted with respect to the first life will not be transmitted to the reinsurers and all data with respect to the joint case will be lost.

D. Reservation of Facilities

The reservation of facilities feature allows the ceding company to submit initial basic information to describe the general nature of the risk and have the reinsurer "reserve" portions of their overall capacity on a potential. The nature of the process is similar to the initial data capture process. This basic information is transmitted electronically to the reinsurer. No additional transmission channels are necessary with the reservation of facilities process. An exemplary Reservation of Facilities screen is shown in FIG. 23.

II. Reinsurance Companies

If the user that logs in to the system is associated with a reinsurance company then the server automatically generates a Reinsurance Summary Information View screen, such as that shown in FIG. 22, listing previously submitted case summaries by ceding companies. The reinsurance company associated with the user that has logged into the system is identified at the top of the screen. The only summary information displayed is that previously submitted by the ceding companies to that particular reinsurance company. As previously mentioned, the reinsurance company is not able to view any summary information for which they were not designated by a ceding company.

A series of search options are listed at the bottom of the screen in box 2210. The available search options include: showing all current submission for the particular reinsurance company, searching for a specific case by entering its unique submission number, or searching for the last name of the individual. A last option allows the user to view all previously hidden submissions, which is explained in further detail below.

Below the options is a chart or table 2230 of case summary information of all current submissions for that particular reinsurance company, e.g., JCM Re Company. Each case summary is active and thus listed for a predetermined period of time, e.g., 14 days. Upon expiration of a predetermined period of time the case submission entry is automatically removed from the list. In a preferred embodiment shown in FIG. 22, the columns of the table identify the submission number, type of case {Individual case (I), Joint case (J), Additional Papers (A) or Reservation of Facilities (F)}, last name of the individual for whom the summary information pertains, company name and bibliographic information including the individual user who submitted the case, and identification of last person in the particular reinsurer's office who viewed the case summary information. The last two columns of the table are "View" and "Hide" access buttons for each case. The "View" button displays the initial capture information and individual case summary information as it was presented by the ceding company. By way of example, FIG. 24 is the screen that is displayed in response to the user selecting the "View" button for case submission number 444. Each entry identifies the user, company name, and live e-mail link to the user of the ceding company that submitted the case information. FIG. 24 includes the drop down questions and responses provided by the user for an alcohol and/or drug treatment impairment. Similarly, electronic information entered by the ceding company is reproduced as entered and electronic files are presented as hyperlinks.

The "Hide" button when selected removes the particular case summary entry from the list when it is no longer needed. In a preferred embodiment, any user at a given reinsurer that hides an entry from the summary list, removes that entry from all users associated with the same reinsurer. Cases previously hidden by a reinsurance user may be recalled and included in the list by selecting the "Show All Hidden Submission" option from box 2210. A case may be hidden and recalled as often as desired while the entry remains active.

After reviewing the details of a particular case, the user is provided with the option of either selecting the "Return to Submitted Summaries" button 2405 to view another entry or logging out by clicking on button 2410.

III. Auditing

Heretofore, there was no need to audit facultative reinsurance because the ceding company had already provided to the reinsurer its complete set of documentation and the reinsurer was therefore able to render its own independent decision. With the system in accordance with the invention, the reinsurer may now be interested in performing an audit as part of its overall due diligence. As part of the audit the reinsurer will retrospectively, periodically review the original source material that formed the basis for the generated summary after the facultative decision has been rendered by the reinsurer to confirm the accuracy of the summarized information submitted by the ceding company. Factors that may be examined during such an audit process include: (i) whether all routine age-amount requirements were ordered, received, and reviewed by the ceding company?, (ii) whether the impairment(s) were accurately summarized?, (iii) whether all salient factors that applied to the impairment (s) in question were brought to the reinsurer's attention in the summary?, (iv) whether the ceding company failed to bring additional significant factors not necessarily related to the summarized impairments to the attention of the reinsurer?, and (v) whether routine items like currentness of evidence and requirements maintained by the ceding company?

In a preferred embodiment the reinsurer will request a ceding company to retrospectively provide complete original case files for review. Such requests may be random or scheduled. Summary review audits may be shared among reinsurers to reduce duplication of effort and promote confidence in the system.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. An electronic network-based and transmission-channel-based facultative reinsurance transaction method with improved efficiency and performance and an adaptive back-coupled audit process providing a shared decision making process for electronically processing a life insurance facultative case summary submission over a network between a ceding company and one or multiple reinsurers, comprising the steps of:

receiving a username and password entered at a system user login screen, determining whether a system user is a ceding company or a reinsurer, based upon the username and password entered at the user login screen;

dynamically generating user-specific web pages based upon whether the system user is with a ceding company or with a reinsurance company, wherein the system generates case summary information pages for the system user with a ceding company, and wherein the system generates reinsurance summary information view screens for the system user with a reinsurance company;

providing, by a server, a first web page in response to a request to generate a new life insurance facultative case summary submission for at least one new individual to one or more electronically connected computer terminals via a network;

prompting, by the first web page, a user of the ceding company to enter facultative case summary information including basic information and risk factor information for evaluating a risk in providing reinsurance for the at least one new individual, the basic information including basic data to allow a plurality of reinsurers to determine whether the at least one new individual has a pre-existing adverse insurance history;

prompting, by the first web page, the user of the ceding company to identify the plurality of reinsurers to receive the facultative case summary information;

receiving from the user of the ceding company, by the server over the network, the facultative case summary information and the plurality of reinsurers identified by the user of the ceding company to receive the facultative case summary information, wherein the facultative case summary information contains only a subset of information from a corresponding case history file of newly submitted facultative case summary information;

storing the received facultative case summary information and the plurality of identified reinsurers in a memory of the server;

determining, by the server, a plurality of identified reinsurers to receive the facultative case summary information based on the received plurality of reinsurers identified by the user of the ceding company;

providing, by the server, the stored facultative case summary information in a second web page to users of the plurality of identified reinsurers, the facultative case summary information being used by the users of the plurality of identified reinsurers to render initial facultative decisions on whether to provide reinsurance for the newly submitted facultative case summary information, wherein the second web page displays, for a user of each of the plurality of identified reinsurers, a list including the stored facultative case summary information and any other facultative case summary information for other individuals that the server determines was submitted to the respective identified reinsurer,
wherein the basic information included in the facultative case summary information includes a policy number, insurance policy amount, date of birth, and sex for the at least one new individual for which the generation of the new life insurance facultative case summary submission is requested, and
wherein the risk factor information included in the facultative case summary information includes range of cholesterol/HDL level, build, and blood pressure level for the at least one new individual for which the generation of the new life insurance facultative case summary submission is requested; and
performing, by the server, an audit of facultative reinsurance by retrospectively and periodically reviewing original source material that formed a basis for the facultative case summary information after a facultative decision has been rendered by one of the reinsurers to confirm accuracy of the facultative case summary information submitted by the ceding company, wherein, upon random request by the one of the reinsurers, the ceding company retrospectively provides a complete original case files for review,
wherein the audit of the facultative reinsurance includes: (i) determining whether all routine age-amount requirements were ordered, received, and reviewed by the ceding company; (ii) determining whether impairments were accurately summarized in the facultative case summary information; and (iii) determining whether currentness of evidence and requirements are maintained by the ceding company.

2. The method in accordance with claim 1, wherein the receiving step further comprises receiving from the user of the ceding company a selection of a type of case to be submitted.

3. The method in accordance with claim 2, wherein the type of case to be submitted is one of an individual case and a joint case summary submission of information not previously presented.

4. The method in accordance with claim 1, further comprising prompting the user of the ceding company to provide identifying information, the identifying information including the risk factor information.

5. The method in accordance with claim 4, wherein the facultative case summary information of the at least one new individual is provided before any additional papers and/or supplemental information for the at least one new individual.

6. The method in accordance with claim 1, further comprising transmitting the facultative case summary information to the plurality of identified reinsurers via at least one mode of channel transmission selected by the user of the ceding company.

7. The method in accordance with claim 6, wherein the modes of channel transmission comprise electronic transmission, facsimile transmission and voice transmission.

8. The method in accordance with claim 7, in response to selection of one of facsimile transmission and voice transmission as the selected mode of channel transmission, forwarding a pre-notification message to the identified reinsurer of a future facultative case summary submission to follow.

9. The method in accordance with claim 7, wherein the electronic transmission mode of channel transmission comprises at least one of electronic data entry, selection from a drop down impairment menus and uploading of electronic files.

10. The method in accordance with claim 9, in response to selection of an impairment from a drop down menu by the user of the ceding company, generating a new screen of associated questions based on the selected impairment.

11. The method in accordance with claim 9, wherein the electronic file to be uploaded may be at least one of EKG tracings, pathology reports, and sections of APS reports.

12. The method in accordance with claim 1, further comprising:
receiving from the user of the ceding company information identifying a particular previously received facultative case summary submission; and
receiving additional case summary information associated with the particular previously received facultative case summary submission.

13. The method in accordance with claim 12, wherein the additional case summary information is transmitted to the identified reinsurer via a selected mode of channel transmission comprising at least one of electronic transmission, facsimile transmission and voice transmission.

14. The method in accordance with claim 1, further comprising receiving instructions to reserve facilities for at least one case for possible submission at a future point in time.

15. The method in accordance with claim 1, in response to a user of a particular reinsurer visiting a web site to access the previously submitted facultative case summary information, further comprising displaying only those previously submitted facultative case summary information designated by the user of the ceding company to be transmitted to that reinsurer.

16. The method in accordance with claim 1, wherein the case history file is a complete case history file of the newly submitted facultative case summary information.

17. An electronic network-based and transmission-channel-based facultative reinsurance transaction system with improved efficiency and performance and an adaptive back-coupled audit process providing a shared decision making process for electronically processing a life insurance facultative case summary submission over a network between a ceding company and one or multiple reinsurers, comprising:
a computer electronically connected to said network, said computer including a processor, a memory device, and a network interface, the processor being configured to:
receive a username and password entered at a system user login screen;
determine whether a system user is a ceding company or a reinsurer, based upon the username and password entered at the user login screen;
dynamically generating user-specific web pages based upon whether the system user is with a ceding company or with a reinsurance company,
wherein the system generates case summary information pages for the system user with a ceding company, and
wherein the system generates reinsurance summary information view screens for the system user with a reinsurance company;
provide a first web page in response to a request to generate a new life insurance facultative case summary submission for at least one new individual to one or more electronically connected computer terminals via a network,
prompt, by the first web page, a user of the ceding company to enter facultative case summary information including basic information and risk factor information for evaluating a risk in providing reinsurance for the at least one new individual, the basic information including basic data to allow a plurality of reinsurers to determine whether the at least one new individual has a pre-existing adverse insurance history, prompt, by the first web page, the user of the ceding company to identify the plurality of reinsurers to receive the facultative case summary information, receive from the user of the ceding company, over said network, the facultative case summary information and the plurality of reinsurers identified by the user of the ceding company to receive the facultative case summary information, wherein the facultative case summary information contains a subset of information from a corresponding case history file of newly submitted facultative case summary information, store the received facultative case summary information and the plurality of identified reinsurers in the memory device, determine a plurality of identified reinsurers to receive the facultative case summary information based on the received plurality of reinsurers identified by the user of the ceding company, and provide the stored facultative case summary information in a second web page to users of the plurality of identified reinsurers, the facultative case summary information being used by the users of the plurality of identified reinsurers to render initial facultative decisions on whether to provide reinsurance for the newly submitted facultative case summary information, wherein the second web page displays, for a user of each of the plurality of identified reinsurers, a list including the stored facultative case summary information and any other facultative case summary information for other individuals that the server determines was submitted to the respective identified reinsurer, wherein the basic information included in the facultative case summary information includes a policy number, insurance policy amount, date of birth, and sex for the at least one new individual for which the generation of the new life insurance facultative case summary submission is requested, wherein the risk factor information included in the facultative case summary information includes range of cholesterol/HDL level, build, and blood pressure level for the at least one new individual for which the generation of the new life insurance facultative case summary submission is requested, wherein the server performs an audit of facultative reinsurance by retrospectively and periodically reviewing original source material that formed a basis for the facultative case summary information after a facultative decision has been rendered by one of the reinsurers to confirm accuracy of the facultative case summary information submitted by the ceding company, wherein, upon random request by the one of the reinsurers, the ceding company retrospectively provides a complete original case files for review, and wherein the audit of the facultative reinsurance includes: (i) determining whether all routine age-amount requirements were ordered, received, and reviewed by the ceding company; (ii) determining whether impairments were accurately summarized in the facultative case summary information; and (iii) determining whether currentness of evidence and requirements are maintained by the ceding company.

\* \* \* \* \*